US009111348B2

(12) United States Patent
Amma et al.

(10) Patent No.: US 9,111,348 B2
(45) Date of Patent: Aug. 18, 2015

(54) COMPUTER-BASED METHOD AND SYSTEM OF DYNAMIC CATEGORY OBJECT RECOGNITION

(71) Applicant: Toyota Motor Engineering & Manufacturing North America, Inc., Erlanger, KY (US)

(72) Inventors: Ayako Amma, San Jose, CA (US); Joseph M. A. Djugash, San Jose, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 197 days.

(21) Appl. No.: 13/843,793

(22) Filed: Mar. 15, 2013

(65) Prior Publication Data

US 2014/0270361 A1    Sep. 18, 2014

(51) Int. Cl.
*G06K 9/00*    (2006.01)
*G06T 7/00*    (2006.01)

(52) U.S. Cl.
CPC ..... *G06T 7/0046* (2013.01); *G06T 2207/10028* (2013.01); *G06T 2207/20081* (2013.01)

(58) Field of Classification Search
USPC ......................... 382/103, 107, 209, 219, 278
See application file for complete search history.

(56) References Cited

U.S. PATENT DOCUMENTS

| 7,031,496 | B2 | 4/2006 | Shimano et al. | |
|---|---|---|---|---|
| 7,313,289 | B2 * | 12/2007 | Murata et al. | 382/275 |
| 7,496,619 | B2 * | 2/2009 | Aldroubi et al. | 708/446 |
| 8,266,079 | B2 | 9/2012 | Regli et al. | |
| 8,473,141 | B2 * | 6/2013 | Kouno | 701/23 |
| 8,538,757 | B2 * | 9/2013 | Patch | 704/257 |
| 8,558,512 | B2 * | 10/2013 | Iles et al. | 320/145 |
| 8,711,221 | B2 * | 4/2014 | Eggert et al. | 348/148 |
| 8,725,294 | B2 * | 5/2014 | Gienger | 700/259 |
| 8,885,882 | B1 * | 11/2014 | Yin et al. | 382/103 |
| 8,897,600 | B1 * | 11/2014 | Ma et al. | 382/290 |

(Continued)

FOREIGN PATENT DOCUMENTS

| JP | 2010-023950 | 2/2010 |
|---|---|---|
| WO | WO 2005/096178 | 10/2005 |

OTHER PUBLICATIONS

Arie-Nachimson et al; "Construction Implicit 3D Shape Models for Pose Estimation"; 8 pages; 2009.

(Continued)

*Primary Examiner* — Yosef Kassa
(74) *Attorney, Agent, or Firm* — Snell & Wilmer LLP

(57) ABSTRACT

A computer-based method/system of dynamic category object recognition for estimating pose and/or positioning of target objects and target object's parts. The method/system may recognize a target object and the target object's parts. The method/system may segment and extract data corresponding to the target object and the target object's parts, and estimate the pose and positioning of the target object and the target object's parts using a plurality of stored object models. The dynamic method/system may supplement or modify the parameters of the plurality of stored object models and/or store learned object models. The learned object models assist in recognizing and estimating pose and/or positioning of newly encountered objects more accurately and with fewer processing steps. The method and system may include a processor, a sensor, an external device, a communications unit, and a database.

20 Claims, 6 Drawing Sheets

(56) References Cited

U.S. PATENT DOCUMENTS

| | | | |
|---|---|---|---|
| 8,917,336 B2* | 12/2014 | Cote et al. | 348/241 |
| 2004/0042661 A1 | 3/2004 | Ulrich et al. | |
| 2007/0179918 A1 | 8/2007 | Heisele et al. | |
| 2009/0141940 A1 | 6/2009 | Zhao et al. | |
| 2010/0103196 A1 | 4/2010 | Kumar et al. | |
| 2010/0111370 A1 | 5/2010 | Black et al. | |
| 2010/0286827 A1 | 11/2010 | Franzius et al. | |
| 2012/0011119 A1 | 1/2012 | Baheti et al. | |
| 2012/0219211 A1 | 8/2012 | Ding et al. | |
| 2012/0243732 A1 | 9/2012 | Swaminathan et al. | |

OTHER PUBLICATIONS

Borges; "3D Recognition of Parts: A Complete Solution Using Parameterized Volumetric Models"; Anais do IX SIBGRAPI; pp. 111-118; Oct. 1996.

Dickinson; "Object Representation and Recognition"; pp. 1-35; 1999.

Gu et al.; "Discriminative Mixture-of-Templates for Viewpoint Classification"; pp. 408-421; 2010.

Kim et al.; "Combined Model-Based 3D Object Recognition"; International Journal of Pattern Recognition and Artificial Intelligence; vol. 19, No. 7; pp. 839-852; 2005.

Li et al.; "Segmentation and Modeling of Visually Symmetric Objects by Robot Actions"; International Journal of Robotics Research 2011; vol. 30, pp. 1124-1142; Mar. 7, 2011.

Mori et al.; "Efficient Shape Matching Using Shape Contexts"; IEEE Transactions on Pattern Analysis and Machine Intelligence; vol. 27, No. 11; pp. 1832-1837; Nov. 2005.

Vayda et al.; "A Robot Vision System for Recognition of Generic Shaped Objects"; CVGIP: Image Understanding; vol. 54, No. 1; pp. 1-46; Jul. 1991.

Nieuwenhuisen et al; "Shape-Primitive Based Object Recognition and Grasping"; In Proc. of the 7th German Conference on Robotics (ROBOTIK); 5 pages; May 2012.

Zhu et al.; "Face Detection, Pose Estimation, and Landmark Localization in the Wild"; 8 pages; Jun. 2012.

\* cited by examiner

COMPUTER-BASED METHOD AND SYSTEM OF DYNAMIC CATEGORY OBJECT RECOGNITION

BACKGROUND

1. Field

The present disclosure relates generally to a computer-based method and system of dynamic category object recognition in computer vision and more particularly, pertains to a computer-based method and system of dynamically recognizing, using learned object models, positioning and pose information regarding target objects.

2. Description of the Related Art

Object recognition is required in various fields requiring computer vision of a surrounding environment and objects therein. For example, robotic manipulation tasks such as grabbing or picking up an object may require recognition of positioning and pose of target objects. Prior object recognition methods and systems require precise registration of objects for constructing three-dimensional (3-D) models of registration. However, precise registration may require a high capacity of processing. Currently, a computer-based method or system is needed for estimating pose and positioning of target objects without precise object registration.

Moreover, prior methods and systems deploy a fixed pre-programmed object recognition algorithm. A computer-based method or system is needed for estimating pose and positioning of target objects and their corresponding parts using a dynamic algorithm that utilizes learned data for future object recognition.

SUMMARY

The present disclosure relates generally to a computer-based method and system of dynamic category object recognition in computer vision and more particularly, pertains to a method and a system of dynamically recognizing, using learned object models, positioning and pose information regarding target objects.

In one embodiment, the present invention may be, for example, a computer-based method for estimating object pose and positioning information based on a visual data set corresponding to at least a target object, the method including the steps of: providing, using a database, a plurality of object models, each having at least one parameter; analyzing, using a processor, the visual data set in comparison to the stored plurality of object models; constructing, using the processor, an object-fitting model having at least one parameter, based on the analyzed visual data set in comparison to the stored plurality of object models; estimating, using the processor, the at least one parameter of the object-fitting model; and storing, using the processor, a learned object model in the database, based on the object-fitting model and the estimated at least one parameter of the object-fitting model.

In another embodiment, the present invention may be a computer-based method for estimating object pose and positioning information of a target object based on a visual data set including a first visual data and a second visual data, the method comprising the steps of: providing, using a database, a plurality of object models, each having at least one parameter; receiving or detecting, using a processor, a visual data set including a first visual data and a second visual data; recognizing, using the processor, a first target data adjacent to, around, or within a first enclosure of the first visual data as being similar in shape or structure to the first object model; segmenting and extracting, using the processor, a cluster in the second target data that corresponds to the target object based on the first enclosure; analyzing, using the processor, the cluster in comparison to the stored plurality of object models; constructing, using the processor and based on the analyzed visual data set in comparison to the stored plurality of object models, an object-fitting model having at least one parameter; estimating, using the processor, the at least one parameter of the object-fitting model; and storing, using the processor, a learned object model in the database, based on the object-fitting model and the estimated at least one parameter of the object-fitting model.

In yet another embodiment, the present invention may be a computer-based method for estimating object pose and positioning information based on a visual data set corresponding to at least a target object, the method comprising the steps of: providing, using a database, a plurality of object models, each having at least one parameter; recognizing, using the processor and by comparison to the plurality of object models, a target data set as being similar in shape or structure to the object-fitting model; estimating, using the processor, the at least one parameter of the plurality of object models based on the analyzed visual data set in comparison to the stored plurality of object models; and storing, using the processor, a learned object model in the database, based on the object-fitting model and the estimated at least one parameter of the object-fitting model.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Figure 1:
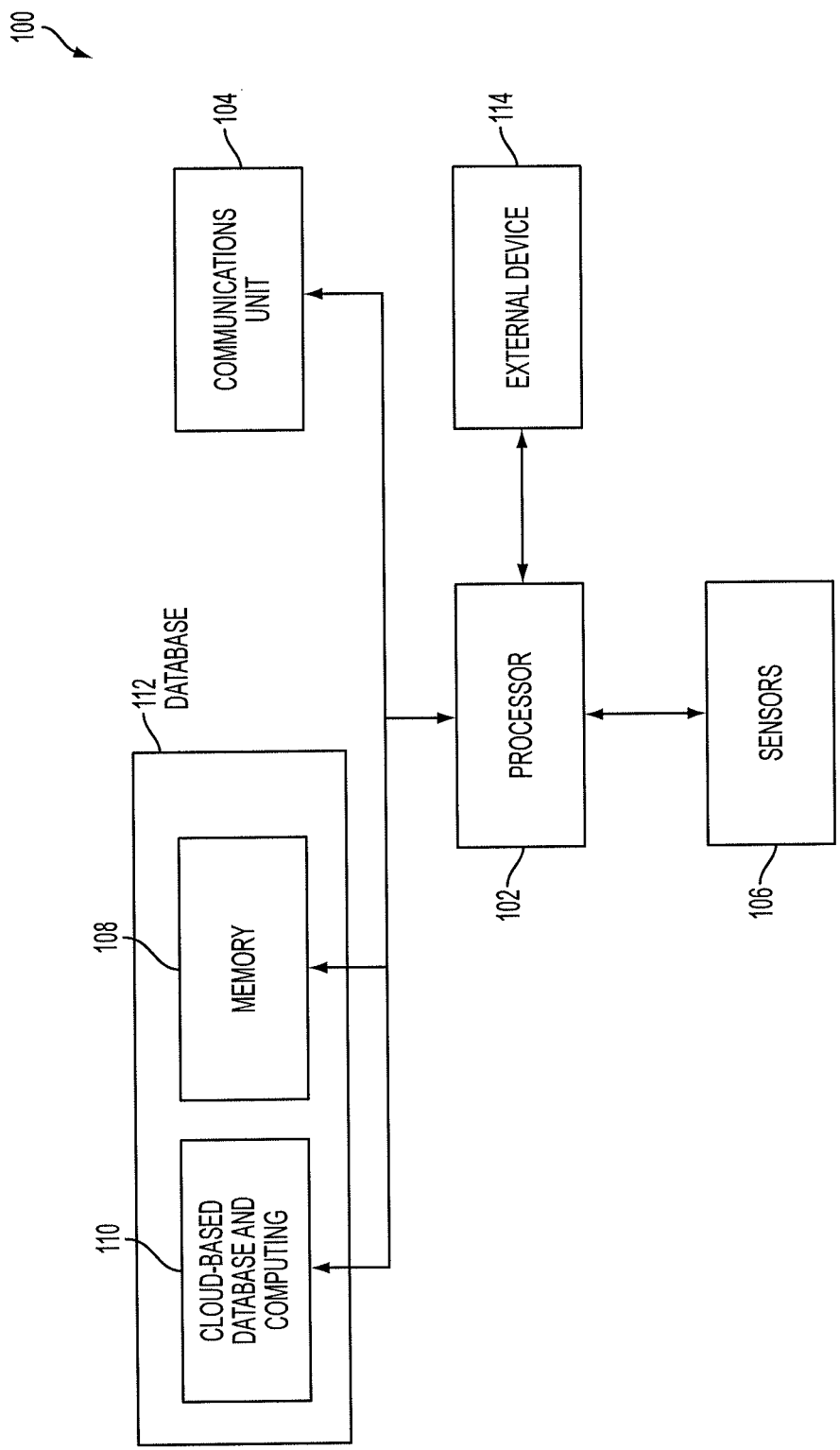
FIG. 1 is a block diagram of a dynamic category object recognition method/system, according to an embodiment of the present invention.

Referring to FIG. 1, a block diagram is shown of a method/system 100 according to an embodiment of the present invention. The method/system 100 may include a processor 102, a communications unit 104, a sensor 106, a database 112, and an external device 114. The database 112 may include a memory 108 and cloud-based database and computing 110. In other embodiments, the database 112 may include solely the memory 108 or solely the cloud-based database and computing 110. The various units of the method/system 100 may be in communication with one another by utilizing transmission of an electronic signal through a Control Area Network (CAN) bus. In other embodiments, the control and communication may be over various other types of serial communication links, direct wirings, digital communication buses, wireless communications, or other communication links and networks.

The method/system 100 is not limited to any particular device, unit, or platform. In one embodiment, the method/system 100 is integrated in a robotic device or coupled to a robotic platform.

Referring to FIG. 1, the method/system 100 may utilize the sensor 106 to detect a visual data set. The sensor 106 may be a single sensor or a plurality of sensors operating in concert together to detect data. The sensor 106 may include converters that measure a physical quantity and convert the measured physical quantity into a signal which can be analyzed or processed by the processor 102. The sensor 106 may be integrated in or coupled to the method/system 100. The sensor 106 may be positioned at a distance away from the method/system 100 such that the sensor 106 are in communication with the processor 102 e.g., via a network. The processor 102 may be coupled to or in communication with the external device 114 in order to supplement the data detected by the sensor 106.

The sensor 106 may further include an image sensor or a camera that may be integrated in, coupled to, or in communication with the method/system 100 for capturing images/videos of an environment and/or objects therein. Alternatively or in addition to the camera, a 3-D depth sensor may be utilized to detect 3-D data regarding the environment and/or objects therein.

The sensor 106 may include perimeter monitoring sensors or ultraviolet, radio frequency, or infrared sensors. A 3-D scanner may be employed to analyze a real-world object or environment to collect data on its shape and its appearance (e.g., color). The detected data is then communicated to the processor 102 for constructing digital 3-D models. Various other sensors may be integrated in, coupled to, or in communication with the sensor 106 in order to improve the quality or increase the quantity of the detected visual data without limiting the scope of the present invention.

If the method/system 100 is coupled to or incorporated within a mobile unit (e.g., a robotic device/platform, vehicle, transportation device and etc.), the mobile unit may traverse an environment. One advantage of traversing the environment is that the processor 102 may be in communication with the sensor 106 to improve the quality and/or increase the quantity of the detected data. Furthermore, by traversing the environment, a 3-D visualization of the environment can be analyzed. For example, the robotic device/platform may traverse an environment or move closer to a person or object that has just entered the environment in order to place at least one of the sensors 106 in a better position to detect the visual data set. For example, the robotic device/platform may move intelligently to capture views of an occluded object, place, or a facial feature of a person. If the path has been previously traversed, the robotic device/platform may eliminate any backtracking that was previously performed.

The source of the detected data may not be the sensor 106. In one embodiment, the processor 102 receives the detected data from the external device 114 or, for example, other external devices in communications with the cloud-based database and computing 110. The invention is directed to analyzing and processing data to provide for dynamic category object recognition. As such, variations in methods of detecting, obtaining, or receiving the visual data do not limit the scope of the present invention.

The database 112 stores data regarding a plurality of category object models. The processor 102 utilizes the plurality of category object models for recognizing target objects, and estimating pose and/or positioning parameters of target objects. The processor 102 may further modify and/or supplement the plurality of object models stored in the database 112. For example, the processor 102 may store learned object models in the database 112 for enabling dynamic category object recognition as to future newly encountered target objects.

Figure 2:
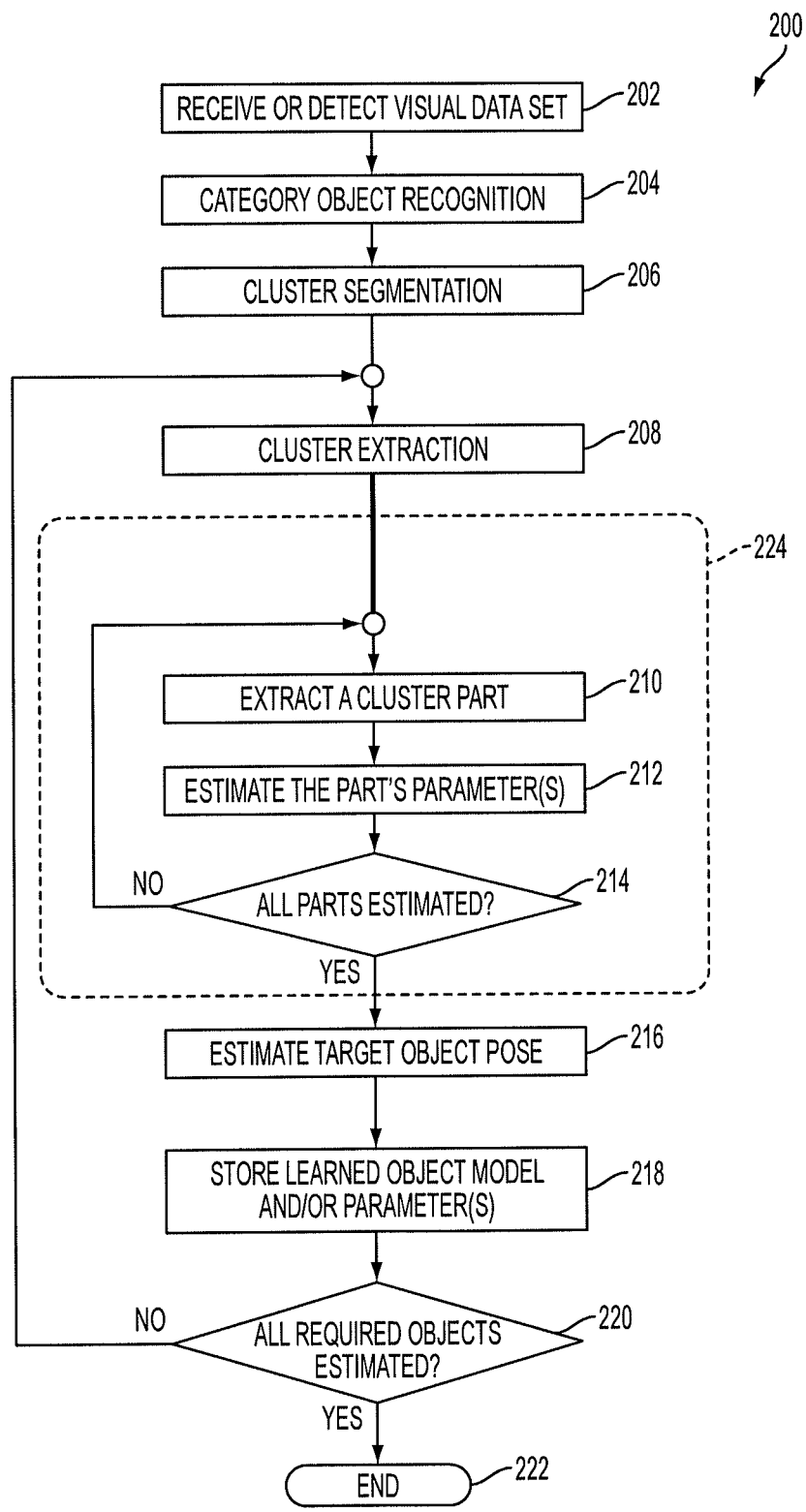
FIG. 2 illustrates a decision flowchart diagram showing a computer-based method/system for performing dynamic category object recognition, according to an embodiment of the present invention.

Referring to FIG. 2, a visual data set corresponding to visual characteristics of an environment is received, by the processor 102 from the database 112 or the external device 114. In addition or in the alternative, the sensor 106 detects the visual data set analyzed by the processor 102.

Figure 3B:
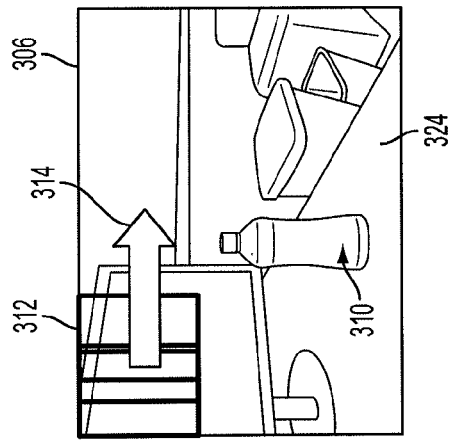
FIGS. 3A-3E illustrate a computer-based method/system for category object recognition applied to a visual data set, according to an embodiment of the present invention.
Figure 3A:
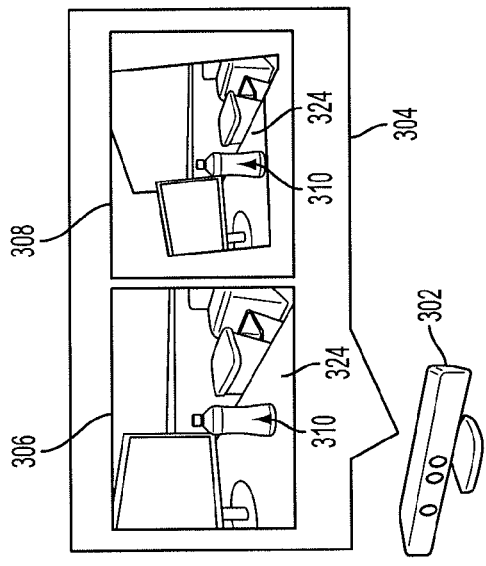

Referring to FIG. 3A, for example, a visual data set 304 of an environment is detected by a 3-D sensor 302. The environment may include at least a target object 310. The method/system 200 seeks to estimate pose information regarding the target object 310. Pose information as used herein may refer to including but not limited to pose or structure of an object; positioning of the object itself; positioning of the object's parts with respect to the object and other object parts; positioning of the object or its parts with respect to the surrounding environment or other objects; size, geometry, and dimensions of the object; structure of the object; parameters defining any pose or positioning of the object; or combinations thereof.

In a preferred embodiment, the processor 102, the 3-D sensor 302, or the sensor 106 may detect or extract two subsets of data from the visual data set 304: a first visual data 306 within the visual data set 304 which may be, for example, two-dimensional (2-D) data and a second visual data 308 which may be, for example, depth or 3-D point data. In one embodiment, the first visual data 306 and the second visual data 308 may be inter-dependent, stemming from the same source of detected data. For example, the first visual data 306 may be a 2-D image corresponding to the same 3-D point data provided by the second visual data 308. In another embodiment, the first visual data 306 and the second visual data 308 may be detected independently. For example, the first visual data 306 may be a 2-D image detected by a camera, and the second visual data 308 may correspond to the 3-D point data detected by a 3-D or depth sensor.

The first visual data 306 and the second visual data 308 may be aligned or calibrated to allow comparison and processing of both the first visual data 306 and the second visual data 308.

A target data set as used herein refers to a section of the visual data set 304 that is recognized in object recognition stage in step 204 of the method/system 200 to correspond to the target object 310. For example, the target data set may refer to both the first visual data 306 and the second visual data 308 that correspond to the target object 310 when the first visual data 306 and the second visual data 308 are calibrated. For example, the target data set may be identified using a first enclosure. In one embodiment, the target data set may correspond to the first visual data 306 and/or the second visual data 308 adjacent to, around, or within the first enclosure.

An exemplary embodiment described herein with respect to FIGS. 2-5 corresponds to processing the first visual data 306 and the second visual data 308 for illustrating the exemplary embodiment in details. However, the method/system 200 may be applied to the visual data set 304 as a whole (for example, without separation into the first visual data 306 and the second visual data 308). The visual data set 304 may be 2-D data, 3-D data, or other types of data. For example, the exemplary embodiment described below with respect to step 204 corresponds to analysis of the first visual data 306. However, in other embodiments, solely 2-D data, solely 3-D data, a combination of 2-D and 3-D data, or other types of data may be utilized to recognize the category objects in step 204.

Referring to FIG. 3A, for example, the first visual data 306 corresponds to a 2-D image of the target object 310 positioned on a plane 324 (e.g., a table). The second visual data 308 corresponds to 3-D depth data of the target object 310 positioned on the plane 324.

Referring to FIG. 2, in step 204, category object recognition is performed for analyzing, using the processor 102, the first visual data 306. The first visual data 306 is analyzed based on a plurality of object models stored in the database 112. For example, the plurality of object models may include primitive shapes such as cylinders, boxes, and the like associated with corresponding parameters defining the primitive shapes. For example, the processor 102 may determine whether any portion of the first visual data 306 corresponds in shape, structure, or in terms of other pose information, to the plurality of object models stored in the database 112. Each of the plurality of object models may have at least one parameter. For example, an object model may be a cylinder with parameters of a height and a radius. For example, an object model may be a box with three parameters of a width, a height, and a length.

When the processor 102 searches for an object model of the plurality of object models, more than one object model may be similar in shape or structure to a portion of the first visual data 306. For example, a body of a bottle (e.g., the target object 310) may be similar in shape or structure to either a cylinder or a box. The processor 102 is configured to determine which of the plurality of object models has the closest fit for the analyzed portion of the first visual data 306. For example, the processor 102 may assign a score (for example, a recognition accuracy percentage) as to the degree of similarity between a particular object model of the plurality of object models and the analyzed portion of the first visual data 306. For example, the processor 102 may choose the object model of the plurality of object models associated with the highest associated score (e.g., recognition accuracy percentage), as the object model that corresponds to the analyzed portion of the first visual data 306. As such, in one embodiment, the processor 102 determines the parameters of the chosen object model.

As described below, the plurality of object models are not fixed. The stored object models and their corresponding parameters may be supplemented or modified. In addition or in the alternative, new category object models may be learned and stored in the database 112 based on the recognized target objects. The discussion at this juncture assumes that the method/system 200 is detecting the target object 310 for the first time, and objects having similar shapes, structure, or pose information to the target object 310 as a whole are not yet encountered and stored.

Referring to FIG. 3B, an example of the category object recognition in step 204 of the method/system 200 is illustrated. For example, the processor 102 may examine the first visual data 306 adjacent to, around, or within the sliding enclosure 312 from left to right, starting from the top left corner of the 2-D image represented by the first visual data 306 moving right thereafter in the direction 314. The processor 102 may recognize objects within the first visual data 306 that are similar in shape or structure to an object model of the plurality of object models stored in the database 112. In other embodiments, instead of the sliding enclosure 312, the visual data set 304, the first visual data 306, the second visual data 308, or combinations thereof may be examined as a whole to determine whether any portion of the first visual data 306 matches an object model stored in the database 112.

Figure 3E:
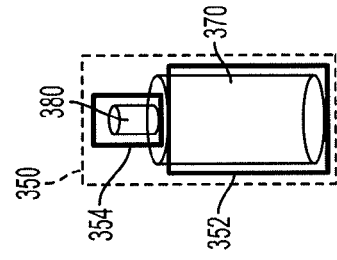
Figure 3D:
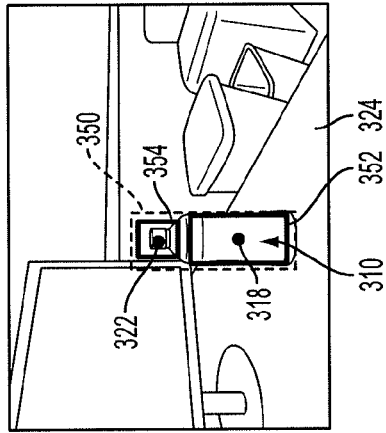
Figure 3C:
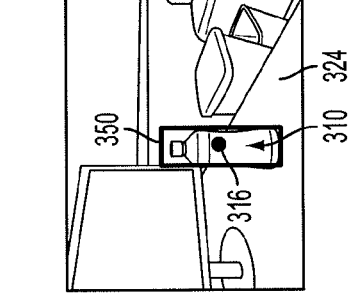

FIG. 3C illustrates a result of the category object recognition of step 204. The processor 102 may recognize that the target object 310 is similar to one of the object models. The first enclosure 350 may be a bounding box, a bounding circle, or any other shape without limiting the scope of the invention. The first enclosure 350 has a first center point 316. When the first enclosure 350 is a bounding box, the first center point 316 is the point with approximately equal distance from each side of the bounding box. When the first enclosure 350 is a bounding circle, the first center point 316 may be the center of the bounding circle. In one embodiment, the processor 102 may determine the first center point 316 such that the first center point 316 is positioned on, corresponds to, or falls within a portion of the visual data set 304 corresponding to the target object 310. The target object 310 may, for example, be positioned within, around, or adjacent to the first enclosure 350. The processor 102 determines that a first target data (which is a portion of the first visual data 306) corresponds to the target object 310.

Referring to FIG. 3D, step 204 of the method/system 200 may further produce enclosures that may be used to recognize a plurality of parts of the target object 310 that are each similar in shape or structure to at least one of the object models stored in the database 112. The number of recognized parts of the target object 310 may depend upon the number of parts of the target object 310 that are similar in shape or structure to at least one of the plurality of object models. As such, the number of recognized may vary between different recognized target objects.

For example, the processor 102 may further recognize that a first target data part of the first target data (e.g., a portion of the first target data adjacent to, around, or within the second enclosure 352) is similar in shape to an object model (e.g., a cylinder). The first target data part of the first target data corresponds to the first part of the target object 310 (e.g., the body of the bottle). The second center point 318 is the center point of the second enclosure 352. In one embodiment, the processor 102 may determine the second center point 318 such that the second center point 318 is positioned on, corresponds to, or falls within a portion of the visual data set 304 corresponding to the first part of the target object 310 (e.g., the body of the bottle).

For example, the processor 102 may further recognize that a second target data part of the first target data (adjacent to, around, or within the third enclosure 354) is similar in shape to an object model (e.g., a cylinder). The second target data part of the first target data corresponds to the second part of the target object 310 (e.g., the head or cap of the bottle). The third center point 322 is the center point of the third enclosure 354. In one embodiment, the processor 102 may determine the third center point 322 such that the second center point 322 is positioned on, corresponds to, or falls within a portion of the visual data set 304 corresponding to the second part of the target object 310 (e.g., the head or cap of the bottle).

The processor 102 may determine that the first target data (which includes the target object 310) corresponds in shape or structure to a first object model (e.g., a cylinder) and determine an object-fitting model 360 (not shown) corresponding to the target object 310.

As shown in FIG. 3E, the processor 102 may determine that the first target data part of the first target data includes the first part of the target object 310 and corresponds in shape or structure to a second object model (e.g., a cylinder) and determine a first part-fitting model 370 corresponding to the first part of the target object 310.

As shown in FIG. 3E, the processor 102 may determine that the second target data part of the first target data includes the second part of the target object 310 and corresponds in shape or structure to a third object model (e.g., a cylinder) and determine a second part-fitting model 380 corresponding to the second part of the target object 310.

In one embodiment, when step 204 is performed, although the overall shape or category of cylindrical shapes of the target object 310, as a whole and in part, are recognized, the pose information (e.g., the associated parameters of the diameter or radius and height of the cylinders, the size, and the positioning) may further be obtained and/or improved with a higher degree of precision in steps 206-218.

In steps 206-216 the object models are fitted with the visual data set 304 (e.g., the second visual data 308 which includes 3-D point data) in order to approximate the parameters using, for example, the RANSAC (RANdom SAmple Consensus) method. Furthermore, the relationship between the first part of the target object 310 and the second part of the target object 310 may be examined using, for example, a Deformable Part Models (DPM) method. For example, the processor 102 may determine whether the first part-fitting model 370 and the second part-fitting model 380 are co-centric, and whether the second part-fitting model 380 is positioned directly above the first part-fitting model 370.

Fitting object-fitting models onto, around, or within the data corresponding to target objects or their corresponding parts, as used herein, is not limited to finding the closest fit on the target objects or their corresponding parts. Fitting, as used herein, includes but is not limited to adjusting at least one parameter and/or adding at least one parameter of the object-fitting models with respect to pose information such that the adjusted or added at least one parameter assists in providing a higher degree of accurate estimation of pose information in any respect as determined by the processor 102. In one embodiment, as described with respect to FIGS. 4A-4F, the first part-fitting model 370 may be determined such that the first part-fitting model 370 is a close fit for the first part of the target object 310 (e.g., the body of the bottle) when positioned within, on, or around the first part of the target object 310. For example, at least one parameter of the first part-fitting model 370 may be determined based on an object model of the plurality of object models such that the first part-fitting model 370 corresponds closely in shape, structure, dimensions, size, in terms of other pose information, or combinations thereof to the first part of the target object 310. For example, at least one parameter of the first part-fitting model 370 is adjusted such that the first part-fitting model 370 is fitted closely within, on, or around data corresponding to the target object 310.

In step 206, the processor 102 segments the second visual data 308 in order to extract 3-D point data adjacent to, around, or within the first enclosure 350, the second enclosure 352, and the third enclosure 354. In essence, the first enclosure 350, the second enclosure 352, and the third enclosure 354 are used as references to crop out the second visual data 308 that does not correspond to the target object 310 and its associated parts. The target object 310 and its associated parts are not necessarily within the corresponding enclosures. The corresponding enclosures are utilized as references to assist in recognizing the data corresponding to the target object 310 and its associated parts. Segmenting and extracting the second visual data 308 allows the processor 102 to fit object models stored in the database or object-fitting models onto, around, or within the corresponding parts of the second visual data 308, for example, using the RANSAC method in order to approximate the corresponding parameters of the first part-fitting model 370 and the second part-fitting model 380.

Figure 4C:
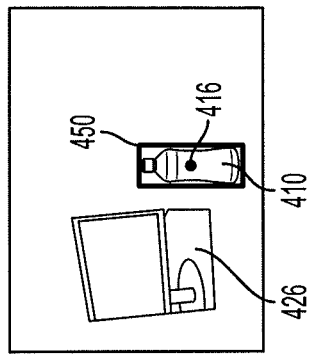
FIGS. 4A-4F illustrate a computer-based method/system for segmentation and extraction based on a plurality of object models, according to an embodiment of the present invention.
Figure 4B:
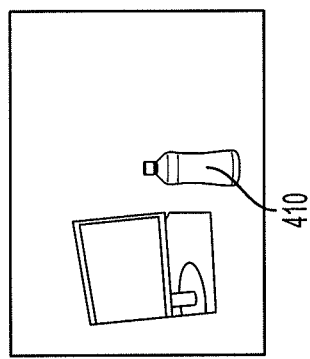
Figure 4A:
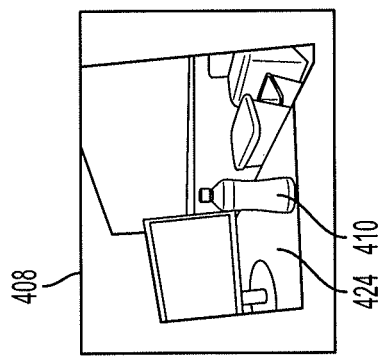
Figure 4F:
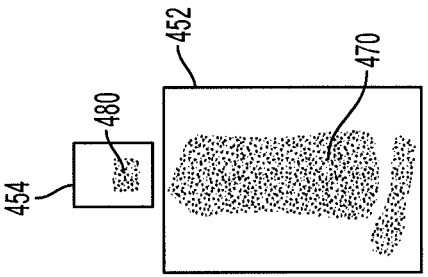

Referring to FIG. 4A, the second visual data 408 is shown before step 206 is performed. The second visual data 408 corresponds to, for example, the second visual data 308 shown in FIG. 3A. The target object 410 and the plane 424 may correspond to the same target object 310 and the plane 324 in FIG. 3A.

In step 206, the processor 102 may temporarily or permanently remove a section of the second visual data 408 corresponding to the plane 424 when the processor 102 determines that the plane 424 may no longer assist in pose estimation of the target object 310.

The produced result of the plane removal procedure is shown in FIG. 4B. As shown in FIG. 4C, the processor 102 may calibrate or align the second visual data 408 with the first visual data 306 in order to segment a cluster 460 of the second visual data 408 around the first center point 416 and within the first enclosure 450. The first enclosure 450 may correspond to and be calibrated with the first enclosure 350 of FIGS. 3C and 3D.

Figure 4E:
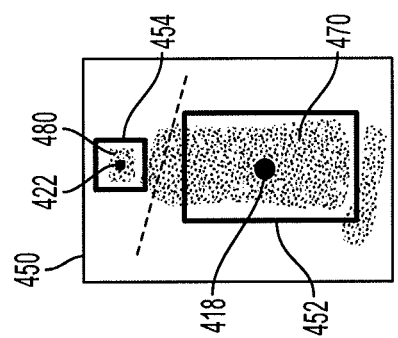
Figure 4D:
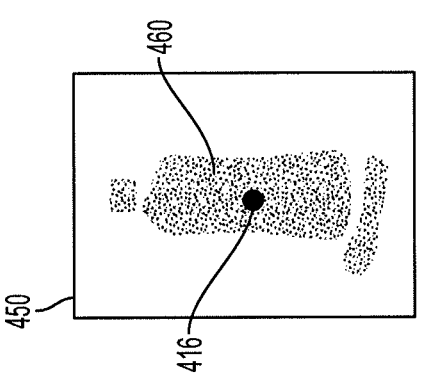

As shown in FIG. 4D, the first center point 416 may correspond to the first center point 316 which is used as a reference point in order to extract 3-D point data in the second visual data 308 that correspond to the target object 310. Using the first enclosure 450 and the first center point 416 in the second visual data 408, a cluster 460 around the first center point 416 within the second visual data 408 is extracted. The cluster 460, for example, in the embodiment shown in FIG. 4D is a cluster of 3-D point data. In other embodiments, the cluster 460 may refer to a cluster, set, group, or division of other forms of data including but not limited to 2D data, without limiting the scope of the present invention.

The processor 102 attempts to fit the object-fitting model 360 onto, around, or within the cluster 460 in order to compare and estimate the associated parameters, for example, using the RANSAC method. For example, the processor 102 may determine the closest corresponding cylinder defined by a diameter (or radius and a height) that best fits or matches the cluster 460.

The method/system 200 has an additional novel advantage of being configured to analyze various parts of the identified clusters in order to fit the object models onto, around, or within the clusters parts to more accurately define pose information and/or positioning of the target objects and the corresponding parts. In step 210, the cluster 460 is segmented into a first cluster part 470 and a second cluster part 480, as discussed below.

For example, as shown in FIG. 4E, the second enclosure 452 of the second visual data 308 (and the second center point 418) corresponds to and is calibrated with the second enclosure 352 (and the second center point 318). The calibrated second center point 418 may be used as a reference point in order to extract 3-D point data in the second visual data 308 that corresponds to the first part of the target object 310. The processor 102 may determine the calibrated second center point 418 such that the second center point 418 is positioned on, corresponds to, or falls within a portion of the second visual data 408 corresponding to the first part of the target object 310. As shown in FIG. 4E, using the second enclosure 452 and the second center point 418 in the second visual data 408, a first cluster part 470 of the cluster 460 around the second center point 418 is extracted.

Figure 5C:
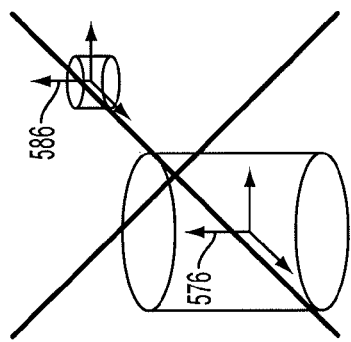
FIGS. 5A-5E illustrate a computer-based method/system for estimation of pose parameters and estimation of positioning of a target object, according to an embodiment of the present invention.
Figure 5E:
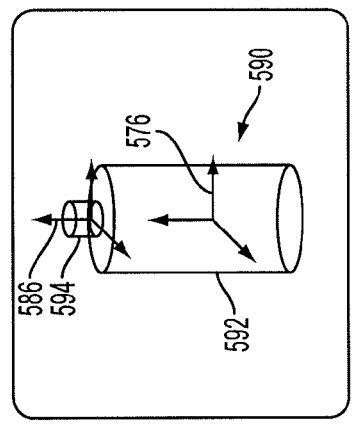

In step 212, the method/system 200 estimates the parameters of the second object model or the first part-fitting model 370 by, for example, estimating associated parameters that provide the best fit of the first part-fitting model 370 onto, around, or within the first cluster part 470. The RANSAC method may distinguish between inliers and outliers in order to estimate the first part-fitting model 370 that fits onto, around, or within the first cluster part 470 defined by the associated parameters. As such, a radius and a height for the first part-fitting model 370 may be estimated. For example, as shown in FIG. 5A, a first part height 572 and a first part diameter 574 of the first cluster part 570 (corresponding to the first cluster part 470) may be estimated.

The process is repeated multiple times by comparing the second object model or the first part-fitting model 370 with the estimated points in another subset of points of the cluster 460 or the first cluster part 470 to find a closer fit. For example, a percentage of accuracy may be determined by dividing the number of points of the first cluster part 470 that fit the first part-fitting model 370 by the total number of points of the first cluster part 470. The processor 102 may determine that the estimation is accurate if the determined percentage is above a certain threshold. For example, the threshold may be 80 percent (%) or 90 percent (%).

After the RANSAC process, the initial parameters (e.g., the height and the radius) stored in the database 112 for the category object model (e.g., the cylinder) can be modified. Other similar methods for matching or fitting the object models and the second visual data 408 may be utilized without limiting the scope of the invention. Various other characteristics (e.g., the gradients and/or smoothness) of the first visual data 306 and the second visual data 408 may be analyzed for improving the fit of the first part-fitting model 370 onto, around, or within the first cluster part 470, without limiting the scope of the present invention.

In step 214, the processor 102 determines whether all parts of the target object 310 are estimated. The processor 102 similarly returns to step 210 to extract the second cluster part 480 and to estimate the associated parameters.

For example, as shown in FIG. 4E, the third enclosure 454 of the second visual data 308 (and the associated third center point 422) corresponds to and is calibrated with the third enclosure 354 (and the third center point 322). The calibrated third center point 422 may be used as a reference point in order to extract 3-D point data in the second visual data 308 that correspond to the second part of the target object 310. The processor 102 may determine the calibrated third center point 422 such that the calibrated third center point 422 is positioned on, corresponds to, or falls within a portion of the visual data set 304 corresponding to the second part of the target object 310. As shown in FIG. 4E, using the third enclosure 454 and the third center point 422 in the second visual data 308, a second cluster part 480 of the cluster 460 around the third center point 422 is extracted.

In step 212, the method/system 200 estimates the parameters of the third object model or the second part-fitting model 380 by, for example, estimating associated parameters that provide the best fit of the second part-fitting model 380 onto, around, or within the second cluster part 480. The RANSAC method may distinguish between inliers and outliers in order to estimate the closest second part-fitting model 380 that fits the second cluster part 480 defined by the associated parameters. As such, a radius and a height for the second part-fitting model 380 may be estimated.

For example, as shown in FIG. 5A, a second part height 582 and a second part diameter 584 of the second cluster part 580 (corresponding to the second cluster part 480) may be estimated using, for example, the RANSAC method set forth above. The processor 102 may further determine whether the relative positioning of the estimated object-fitting model, the first part-fitting model 370 and the second part-fitting model 380 relative to one another or relative to the environments and objects therein are consistent with the visual data set 304.

Figure 5B:
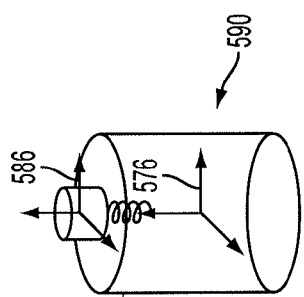
Figure 5A:
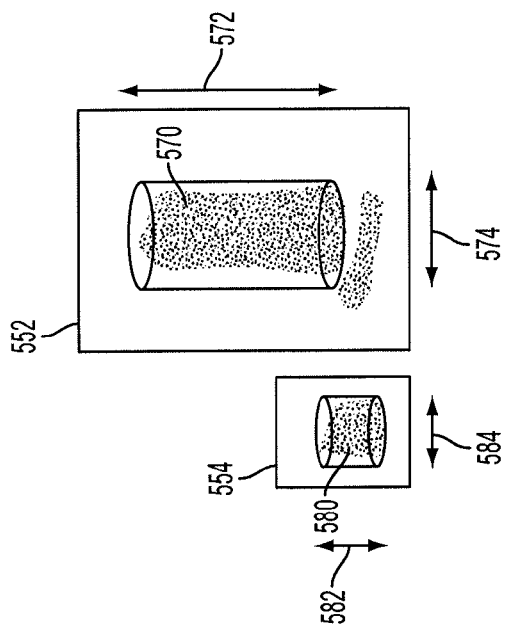

As shown in FIG. 5B, using the DPM method, a first relationship (represented by a spring connection 596 for illustration purposes) between the first part-fitting model 370 and the second part-fitting model 380 relative to one another may be determined, and a second relationship between the first cluster part 470 and the second cluster part 480 may be determined. The processor 102 may compare the first relationship (the spring connection 596) and the second relationship to draw an inference regarding accuracy of the pose and positioning estimation of the target object 310. The analyzed x, y, and z coordinates and positioning of the first part-fitting model 370 is illustrated by the first part positioning 576, and the analyzed x, y, and z coordinates and positioning of the second part-fitting model 380 is illustrated by the second part positioning 586.

Figure 5D:
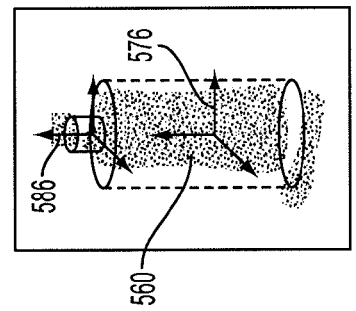

As shown in FIG. 5D, the first determined relationship matches the second determined relationship. For example, the second part-fitting model 380 is properly estimated to be directly above the first part-fitting model 370 and co-centric with the first part-fitting model 370. As such, the DPM method determines that the pose and positioning of the first part-fitting model 370 and the second part-fitting model 380 are estimated with a sufficient degree of accuracy.

FIG. 5C illustrates a scenario in which the DPM method would reject the estimation when the first determined relationship (the spring connection 598) and the second determined relationship are inconsistent. The model in FIG. 5C is rejected because the first relationship, as evident by a spring connection 598 stretched horizontally, suggests that the first part-fitting model 370 is not directly positioned above the second part-fitting model 380. As such, the model shown in FIG. 5C to be inconsistent with the second relationship between the first cluster part 470 and the second cluster part 480.

In step 218, after parameter estimation of the target object 310 and all parts has ended, the processor may 102 determine the pose and positioning of the target object 310 based on the estimated parameters and determined positioning. FIG. 5D shows the estimated parameters produced from steps described above with respect to FIGS. 2, 3A-3E, 4A-4F, and 5A-5E, defining the pose and positioning of the target object 310.

As shown in FIG. 5E, the learned object model 590 is stored as having a first learned object model part 592 and a second learned object model part 594. Each of the first learned object model part 592 and the second learned object model part 594 may have at least one parameter (e.g., a radius or diameter and a height).

In step 218, the processor 102 dynamically and automatically adjusts or supplements parameters of at least one of the plurality of object models. In one embodiment, a new object model may be stored with a set of parameters. For example, a learned object model 590 may be stored as having two stacked cylinders of the first learned object model part 592 and the second learned object model part 594.

One unique advantage of the invention is that the processor 102 may learn new object models and may store the object models in the database 112 to enhance recognition of newly encountered objects. The learned object model 590 may be utilized to recognize objects encountered in the future that have similar shapes, structure, parameters, positioning, and other pose information. For example, the processor 102 may use the first learned object model part 592 as an object-fitting model, a first learned object model part 592 as a first part-fitting model and the second learned object model part 594 as a second part-fitting model for recognizing and estimating parameters of newly encountered objects.

In step 220, the processor 102 determines whether all objects in the visual data set 304 are detected. If a new object is recognized, steps 208-220 are repeated until all required objects are estimated, and the method/system 200 completes estimation in step 222.

Figure 6A:
FIGS. 6A and 6B illustrate a computer-based method/system for pose and/or positioning estimation using a learned object model, according to an embodiment of the present invention.

As shown in FIG. 6A, for example, data corresponding to a newly encountered object 610 is received or detected in step 202. In step 204, the processor 102 may search for an object model in the stored plurality of object models (which at this juncture includes the learned object model 590) similar in shape or structure to the newly encountered object 610.

In one embodiment, two or more of the learned object model 590 may be associated with the same label or may be categorized in a group within the plurality of object models, the learned model objects of the group sharing at least a common characteristic. For example, a group may be labeled as a bottle having at least a common characteristic (e.g., a common characteristic as to the first part and the second part of bottles). For example, when a first learned object model (e.g., the learned object model 590) corresponds to a bottle having a first learned object model part 592 that is substantially cylindrical, the learned object model 590 is assigned and/or labeled as being within the bottle group. When the processor 102 registers, using the method/system 200, a second learned object model of for example, a bottle having a first part that is substantially similar in shape or structure to a box, the processor 102 may assign the second learned object model to the bottle group and/or assign the bottle label to the second learned object model.

Figure 6B:
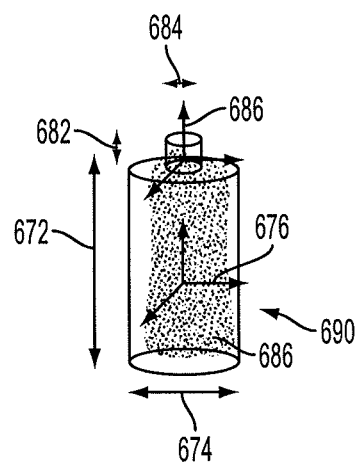

As shown in FIG. 6B, for example, the processor 102 determines that the newly encountered object 610 is similar in overall shape or structure to the learned object model 590. For example, the processor 102, expects the newly encountered object 610 to have a first newly encountered object part similar in shape and parameters (diameter and height) to first learned object model part 592 positioned directly below a second newly encountered object part similar in shape and parameters (diameter and height) to the second learned object model part 594.

The processor 102 may extract a cluster 686 and fit an object-fitting learned model 690 onto, around, or within the cluster 686. The segmentation and extraction of cluster parts as described in step group 224 as shown by a dashed enclosure in FIG. 2 may not be necessary if the object-fitting learned model 690 closely fits the newly encountered object 610. For example, the percentage of points of the cluster 686 fitting with the object-fitting learned model 690 may be examined as described above.

For example, when the processor 102 searches for an object model of the plurality of object models, more than one object model may be similar in share or structure to a portion of the visual data set 304. For example, when the processor 102 may search both registered learned object models labeled as bottle and/or associated with the bottle group described above, the first with a cylindrical body, and the second with a body substantially similar in shape or structure to a box. The processor 102 is configured to determine which of the plurality of object models has the closest fit for the analyzed portion of the first visual data 306. For example, the processor 102 may assign a first score (for example, a first recognition accuracy percentage) as to the first learned object model with the cylindrical body and a second score (for example, a second recognition accuracy percentage) as to the second learned object model with a first part (a body of a bottle) being substantially similar in shape or structure to a box. The processor 102 chooses and recognizes the object model of the plurality of object models associated with the highest associated score (e.g., recognition accuracy percentage), as corresponding to the analyzed portion of the first visual data 306. For example, the first or the second learned object model within the bottle group having the highest associated score (e.g., recognition accuracy percentage) may be chosen.

One novel advantage of the method/system 200 is that the processor 102 may estimate the parameters 672, 674, 682, and 684, and the first part positioning 676 and the second part positioning 684 more accurately and/or with fewer processing steps using the learned object model 590 and the object-fitting learned model 690, for example, as described above with respect to steps 202, 204, 206, 208, and 216 of the method/system 200.

In one embodiment, the processor 102 may further direct the communications unit 104 or the external device 114 to generate an output data corresponding to a question or inquiry regarding newly encountered objects that do not match at least one of the plurality of stored object models. In another embodiment, the processor 102 may supplement the analysis of the method/system 200 based on the response of a user to a response of an electronic device regarding characteristics of the newly encountered objects.

In the embodiment described above, in the interest of brevity, analysis of data corresponding to two parts of the target object 310 is described. However, the process may be repeated for additional parts (e.g., three or more parts) of target objects without limiting the scope of the present invention. For example, as described with respect to step 214 of the method/system 200, the analysis may be repeated for three or more parts of target objects as necessary. Moreover, more than one target object may be analyzed without limiting the scope of the present invention. For example, as described with respect to step 220 of the method/system 200, the analysis may be repeated for three or more target objects as necessary before reaching step 222 of the method/system 200.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., android, iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Specific information related to the protocols, standards, and application software utilized in connection with the Internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

Systems, methods and computer program products are provided. References to "various embodiments", in "some embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The steps of a method or algorithm described in connection with the examples disclosed herein may be embodied directly in hardware, in a software module executed by the processor 102, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor 102 such that the processor 102 can read information from, and write information to, the storage medium. In the alternative, the storage medium may be integral to the processor 102. The processor 102 and the storage medium may reside in an Application Specific Integrated Circuit (ASIC).

The methods/systems may be described herein in terms of functional block components, screen shots, optional selections and various processing steps. It should be appreciated that such functional blocks may be realized by any number of hardware and/or software components configured to perform the specified functions. For example, the methods/systems may employ various integrated circuit components, e.g., memory elements, processing elements, logic elements, look-up tables, and the like, which may carry out a variety of functions under the control of one or more microprocessors or other control devices. Similarly, the software elements of the methods/systems may be implemented with any programming or scripting language such as, VPL, C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and XML with the various algorithms being implemented with any combination of data structures, objects, processes, routines or other programming elements. Further, it should be noted that the methods/systems may employ any number of conventional techniques for data transmission, signaling, data processing, network control, and the like.

As will be appreciated by one of ordinary skill in the art, the methods/systems may be embodied as a customization of an existing system, an add-on product, upgraded software, a stand-alone system, a distributed system, a method, a data processing system, a device for data processing, and/or a computer program product. Furthermore, the methods/systems may take the form of a computer program product on a non-transitory computer-readable storage medium having computer-readable program code means embodied in the storage medium. Any suitable computer-readable storage medium may be utilized, including hard disks, CD-ROM, optical storage devices, magnetic storage devices, and/or the like.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A computer-based method for estimating object pose and positioning information of a target object based on a visual data set corresponding to at least the target object, the method comprising the steps of:
    providing, using a database, a plurality of category object models, each category object model having at least one parameter relating to a geometrical characteristic of the each category object model;
    analyzing, using a processor, the visual data set in comparison to the plurality of category object models;
    fitting, using the processor and based on analyzing the visual data set in comparison to the plurality of category object models, an object-fitting model onto, around, or within a portion of the analyzed visual data set corresponding to the target object, the object-fitting model having at least one parameter relating to a geometrical characteristic of the object-fitting model;
    estimating, using the processor, the at least one parameter of the object-fitting model; and
    storing, using the processor, a learned object model having at least one parameter in the database, based on the object-fitting model and the estimated at least one parameter of the object-fitting model for enhancing subsequent object recognition based on the learned object model.

2. The method of claim 1 further comprising:
    recognizing, using the processor and by comparison of the visual data set to the plurality of category object models, a target data set as being similar in shape or structure to the object-fitting model,
    wherein the step of fitting the object-fitting model is based on the recognized target data set.

3. The method of claim 2 further comprising:
    segmenting and extracting, using the processor, a cluster from the target data set, the cluster corresponding to the target object;
    recognizing, using the processor, at least one of a plurality of cluster parts of the cluster as being similar in shape or structure to at least one corresponding part-fitting model of a plurality of part-fitting models; and
    wherein the step of estimating the at least one parameter of the object-fitting model is based on analyzing, using the processor, the segmented and extracted cluster and analyzing, using the processor, the plurality of cluster parts.

4. The method of claim 2 further comprising:
    recognizing, using the processor and by comparison of the visual data set to the plurality of category object models, a first target data part of the target data set as being similar in shape or structure to a first part-fitting model having at least one parameter; and estimating, using the processor, the at least one parameter of the first part-fitting model by analyzing, using the processor, the first target data part.

5. The method of claim 4 wherein the step of storing the learned object model is based on the estimated at least one parameter of the object-fitting model or the estimated at least one parameter of the first part-fitting model.

6. The method of claim 5 further comprising:
recognizing, using the processor and by comparison of the visual data set to the plurality of category object models, a second target data part of the target data set as being similar at least in shape or structure to a second part-fitting model having at least one parameter; and
estimating, using the processor, the at least one parameter of the second part-fitting model by analyzing, using the processor, the second target data part.

7. The method of claim 6 wherein the step of storing the learned object model is based on the estimated at least one parameter of the object-fitting model, the estimated at least one parameter of the first part-fitting model, the estimated at least one parameter of the second part-fitting model, or combinations thereof.

8. The method of claim 7 further comprising:
segmenting and extracting, using the processor, a first cluster part from the cluster, the first cluster part corresponding to the first target data part, wherein the step of estimating the at least one parameter of the first part-fitting model is based on analyzing the segmented and extracted first cluster part; and
segmenting and extracting, using the processor, a second cluster part from the cluster, the second cluster part corresponding to the second target data part, wherein the step of estimating the at least one parameter of the second part-fitting model is based on analyzing the segmented and extracted second cluster part.

9. The method of claim 8 further comprising:
determining, using the processor, a first relationship between a positioning of the first part-fitting model and a positioning of the second part-fitting model;
determining, using the processor, a second relationship between a positioning of the first cluster part and a positioning of the second cluster part;
comparing, using the processor, the second relationship to the first relationship; and
estimating or modifying, using the processor, the positioning of the first part-fitting model and the positioning of the second part-fitting model based on the compared second relationship to the first relationship.

10. The method of claim 1 further comprising:
analyzing, using the processor, data corresponding to a newly encountered object in comparison to the plurality of category object models and the learned object model;
recognizing, using the processor, a portion of the data corresponding to the newly encountered object as being similar in shape or structure to the learned object model;
fitting, using the processor, the learned object model onto, around, or within the cluster; and
estimating, using the processor, the at least one parameter of the learned object model based on the step of fitting the learned object model.

11. The method of claim 10 wherein the estimating the at least one parameter of the object-fitting learned model is based on modifying the at least one parameter of the learned model to determine a close fit for the portion of the data corresponding to the newly encountered object.

12. The method of claim 10 further comprising:
outputting, using the processor and a communications unit coupled to the processor, an output data corresponding to an inquiry directed to eliciting a response regarding the newly encountered object.

13. A computer-based method for estimating pose and positioning information of target objects based on a visual data set including a first visual data and a second visual data, the method comprising the steps of:
providing, using a database, a plurality of category object models, each category object model having at least one parameter relating to a geometrical characteristic of the each category object model;
receiving or detecting, using a processor, the visual data set corresponding at least to a target object;
recognizing, using the processor and by comparison of the first visual data to the plurality of category object models, a first target data adjacent to, around, or within a first enclosure of the first visual data as being similar in shape or structure to a first category object model of the plurality of category object models;
segmenting and extracting, using the processor, a cluster in the second visual data that corresponds to the target object based on the first enclosure;
analyzing, using the processor, the cluster in comparison to the plurality of category object models;
fitting, using the processor, an object-fitting model onto, around, or within the analyzed cluster;
estimating, using the processor, at least one parameter of the object-fitting model relating to a geometrical characteristic of the object-fitting model; and
storing, using the processor, a learned object model in the database, based on the object-fitting model and the estimated at least one parameter of the object-fitting model for enhancing subsequent object recognition based on the learned object model.

14. The method of claim further comprising:
recognizing, using the processor and by comparison of the first visual data to the plurality of category object models, a first target data part of the first target data adjacent to, around, or within a second enclosure as being similar in shape or structure to a first part-fitting model having at least one parameter;
segmenting and extracting, using the processor, a first cluster part of the cluster based on the second enclosure;
analyzing, using the processor, the first cluster part in comparison to the plurality of category object models; and
fitting, using the processor, a first part-fitting model onto, around, or within the analyzed cluster, the first part-fitting model having at least one parameter.

15. The method of claim 14 wherein the step of storing the learned object model is based on the estimated at least one parameter of the object-fitting model or the estimated at least one parameter of the first part-fitting model.

16. The method of claim 15 further comprising:
recognizing, using the processor and by comparison of the first visual data to the plurality of category object models, a second target data part of the first target data adjacent to, around, or within a third enclosure as being similar in shape or structure to a second part-fitting model having at least one parameter;
segmenting and extracting, using the processor, a second cluster part of the cluster based on the third enclosure;
analyzing, using the processor, the second cluster part in comparison to the plurality of category object models; and fitting, using the processor, a second part-fitting model onto, around, or within the analyzed second cluster part, the second part-fitting model having at least one parameter.

17. The method of claim 16 wherein the step of storing the learned object model is based on the estimated at least one parameter of the object-fitting model, the estimated at least one parameter of the first part-fitting model, the estimated at least one parameter of the second part-fitting model, or combinations thereof.

18. A computer-based method for estimating object pose and positioning information based on a visual data set corresponding to at least a target object, the method comprising the steps of:

providing, using a database, a plurality of category object models, each category object model having at least one parameter relating to a geometrical characteristic of the each category object model;

recognizing, using a processor and by comparison of the visual data set to the plurality of category object models, a target data set adjacent to, around, or within a first enclosure as being similar in shape or structure to a first category object model of the plurality of category object models having at least one parameter relating to a geometrical characteristic of the first category object model;

analyzing, using the processor, the recognized target data set in comparison to the plurality of category object models;

estimating, using the processor, the at least one parameter of the plurality of category object models based on the analyzed visual data set in comparison to the plurality of category object models; and storing, using the processor, a learned object model in the database, based on the object-fitting model and the estimated at least one parameter of the object-fitting model for enhancing subsequent object recognition based on the learned object model.

19. The method of claim 18 further comprising:

segmenting and extracting, using the processor, a cluster adjacent to, around, or within a first enclosure of the target data set that corresponds to the target object; and analyzing, using the processor, the cluster in comparison to the plurality of category object models, wherein the estimating the at least one parameter of the plurality of category object models is based on the analyzed cluster.

20. The method of claim 19 further comprising:

fitting, using the processor and based on the estimated at least one parameter of the plurality of category object models, an object-fitting model onto, around, or within the analyzed cluster, the object-fitting model having at least one parameter, wherein the learned object model is based on the object-fitting model; and analyzing, using the processor, newly encountered objects using the plurality of category object models and the learned object model.

* * * * *